(12) United States Patent
Kim

(10) Patent No.: US 11,142,179 B2
(45) Date of Patent: Oct. 12, 2021

(54) METHOD AND SYSTEM FOR PREDICTING REPLACEMENT TIME OF CARTRIDGE OF AIR PROCESSING UNIT

(71) Applicants: Hyundai Motor Company, Seoul (KR); Kia Motors Corporation, Seoul (KR)

(72) Inventor: Dong Wook Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 316 days.

(21) Appl. No.: 16/454,612

(22) Filed: Jun. 27, 2019

(65) Prior Publication Data
US 2020/0318543 A1    Oct. 8, 2020

(30) Foreign Application Priority Data
Apr. 2, 2019  (KR) .......... 10-2019-0038359

(51) Int. Cl.
| | | |
|---|---|---|
| B60T 17/00 | (2006.01) | |
| B01D 46/44 | (2006.01) | |
| B01D 46/00 | (2006.01) | |
| F02M 35/024 | (2006.01) | |
| B01D 46/24 | (2006.01) | |

(52) U.S. Cl.
CPC .......... *B60T 17/004* (2013.01); *B01D 46/008* (2013.01); *B01D 46/444* (2013.01); *B01D 46/446* (2013.01); *B01D 46/2411* (2013.01); *F02M 35/02416* (2013.01)

(58) Field of Classification Search
CPC .. B01D 46/008; B01D 46/444; B01D 46/446; B01D 46/2411; B01D 2259/40084; B60T 17/004; B60T 13/268; F02M 35/02416
See application file for complete search history.

(56) References Cited

U.S. PATENT DOCUMENTS 9,254,826 B2 * 2/2016 Jin .......................... B60T 13/26

FOREIGN PATENT DOCUMENTS

KR    10-2014-0078172 A    6/2014

* cited by examiner

*Primary Examiner* — Robert Clemente
(74) *Attorney, Agent, or Firm* — Mintz Levin Cohn Ferris Glovsky and Popeo, P.C.; Peter F. Corless

(57) ABSTRACT

A method and system of predicting a replacement time of a cartridge for an air processing unit (APU) of a vehicle, include: checking an internal pressure of an air tank by a controller when an engine of the vehicle is started; calculating and accumulating a passing flow amount through the cartridge of the APU using a pressure change due to filling the air tank with air; and determining that the replacement time of the cartridge has been reached when an accumulated total passing flow amount exceeds a predetermined value. Therefore, it is possible to predict the replacement time of the cartridge by calculating an air flow amount based on the pressure change of the air tank.

6 Claims, 5 Drawing Sheets

METHOD AND SYSTEM FOR PREDICTING REPLACEMENT TIME OF CARTRIDGE OF AIR PROCESSING UNIT

CROSS REFERENCE TO RELATED APPLICATION

The present application claims under 35 U.S.C. § 119(a) the benefit of Korean Patent Application No. 10-2019-0038359, filed Apr. 2, 2019, the entire contents of which are incorporated by reference herein.

BACKGROUND

1. Technical Field

The present disclosure relates to a method and system for predicting a replacement time of a cartridge for an Air Processing Unit (APU), more particularly, to the method and system configured to calculate an air flow amount based on a pressure change of an air tank in a vehicle with a mechanical APU so as to predict the replacement time of the cartridge.

2. Description of the Related Art

FIG. 1 (RELATED ART) is a block diagram showing the configuration of an Air Management System (AMS) of a large truck equipped with a mechanical APU, in which air compressed by an air compressor 1 is transmitted to an APU 2 and undergoes a foreign substance collection and dehumidification process while passing through a cartridge 2a in the APU 2, whereby clean dry air is supplied to an air tank 3.

FIG. 2 (RELATED ART) is a block diagram showing the configuration of an AMS of a large truck equipped with an Electronic Air Processing Unit (E-APU), in which, similar to the mechanical APU, compressed air is transmitted from an air compressor 10 to an E-APU 20 and undergoes a foreign substance collection and dehumidification process while passing through a cartridge 21 in the E-APU 20, whereby clean dry air is supplied to an air tank 30.

In particular, the E-APU includes an electronic control unit (ECU) 40 therein and has discharge flow amount information of the air compressor mapped for each engine RPM. Accordingly, the ECU 40 of the E-APU receives engine RPM information and time information through CAN communication with an ECU 50 of a vehicle, calculates the total passing flow amount of wet air that has passed through the APU cartridge and compares the total passing flow amount with a cartridge lifespan flow amount. When the total passing flow amount exceeds the life flow amount, the ECU shows a cartridge replacement warning light, so customers can easily know the cartridge replacement cycle.

However, the mechanical APU is not equipped with an ECU, unlike the E-APU, so it cannot receive fundamental automotive information. Accordingly, it is impossible to estimate the amount of wet air that has passed through the APU cartridge, so it is difficult to determine the replacement cycle of the cartridge.

In particular, a recommended replacement cycle is set in the mechanical APU cartridge on the basis of the mileage and operation period, but users have to remember the replacement cycle in person, so they miss the set replacement time in many cases.

Further, since drivers have different driving behaviors, the degree of consumption of compressed air is different. Drivers who consume a large amount of air use a cartridge with the filtering and dehumidifying function lost before the replacement time of the cartridge is reached.

In this case, foreign substances, or oil, water, etc. flow to parts (a compressed air storage, various valves, and an actuator) positioned at the rear end of the cartridge and damage a rubber, a spring. etc. in the parts, thereby causing serious problems with a pneumatic brake system.

In contrast, drivers who consume a small amount of air replace a cartridge early although the actual lifespan of the cartridge remains, which is inefficient in terms of the maintenance cost of a vehicle.

In particular, when the E-APU described above is used, a warning light showing a cartridge replacement period is automatically calculated and displayed, so these problems can be prevented. However, the E-APU is disadvantageous because the material cost is undesirably high in comparison to the mechanical APU.

The description provided above as a related art of the present disclosure is just for helping understanding the background of the present disclosure and should not be construed as being included in the related art known by those skilled in the art.

SUMMARY

The present disclosure provides a method and system for predicting a replacement time of a cartridge for an Air Processing Unit (APU), the method and system being able to predict the replacement time of the cartridge by calculating an air flow amount based on a pressure change of an air tank in a vehicle equipped with a mechanical APU.

According to one aspect of the present disclosure, a method of predicting a replacement time of a cartridge for an APU includes: checking, by a controller, an internal pressure of an air tank when an engine of a vehicle is started; calculating and accumulating, by the controller, a passing flow amount through the cartridge of the APU using a pressure change due to filling the air tank with air; and determining, by the controller, that the replacement time of the cartridge has been reached when an accumulated total passing flow amount exceeds a predetermined value.

The passing flow amount may be calculated by multiplying a pressure change value to a time variation during filling the air tank with air by a total volume of the air tank, and the total passing flow amount may be calculated by accumulating the passing flow amount that is calculated every time the air tank is filled with air.

Calculating the passing flow amount may include: filling the air tank with air if pressure when an engine is started is less than cut-out pressure; calculating a first passing flow amount from a following Formula 1 when internal pressure of the air tank that is being filled with air reaches the cut-out pressure; using and consuming the air stored in the air tank; filling the air tank with air when the internal pressure of the air tank reaches cut-in pressure due to consumption of the air; calculating an n-th passing flow amount from a following Formula 2 when the internal pressure of the air tank that is being filled with air reaches the cut-out pressure; and calculating a total passing flow amount by accumulating the n-th passing flow amount to the first passing flow amount.

$$Q_0 = \{(P_1 - P_0)/\Delta t\} \times V_t \ldots \quad \text{(Formula 1)}$$

$$Q_n = \{(P_{max} - P_{min})/\Delta t\} \times V_t \ldots \quad \text{(Formula 2)}$$

The above equations include the following variables: $Q_0$: first passing flow amount (first passing flow amount after engine is started);

$P_0$: air tank pressure when engine is started;
$P_1$: first cut-out pressure after engine is started;
$Q_n$: n-th passing flow amount;
$P_{max}$: cut-out pressure;
$P_{min}$: cut-in pressure; and
$V_t$: total volume of air tank.

The method may further include showing a cartridge replacement time when determining that the replacement time of the cartridge has been reached.

According to another aspect of the present disclosure, a system for predicting a replacement time of a cartridge for an APU includes: a pressure checker configured to check a pressure of an air tank detected through a pressure sensor; a passing flow amount calculator configured to calculate a passing flow amount through the cartridge of the APU using a pressure change due to filling the air tank with air, and accumulating and storing the flow amounts; and a replacement time determiner configured to determine that the replacement time of the cartridge has been reached, when a total passing flow amount accumulated by the passing flow amount calculator exceeds a predetermined value.

According to the present disclosure, it is possible to predict a cartridge replacement time of the APU even in a vehicle equipped with the mechanical APU and warn a driver of the replacement time, so it is possible to replace the cartridge at an accurate time. Accordingly, it is possible to prevent breakage of constituent parts of a compressed air system and increase the lifespan of the parts.

According to a further aspect of the present disclosure, a non-transitory computer readable medium containing program instructions executed by a processor includes: program instructions that check an internal pressure of an air tank when an engine of a vehicle is started; program instructions that calculate and accumulate a passing flow amount through a cartridge of an air processing unit (APU) using a pressure change due to filling the air tank with air; and program instructions that determine that the replacement time of the cartridge has been reached when an accumulated total passing flow amount exceeds a predetermined value.

Further, there is no need for using an expensive electronic air processing unit (E-APU) that informs a driver of a replacement time by automatically calculating the passing flow amount through the cartridge, so the cost of a vehicle can be decreased.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure are described hereafter in detail with reference to the accompanying drawings.

The present disclosure is capable of predicting a replacement time of a cartridge 210 of a mechanical APU 200 by reflecting a logic that can calculate the flow amount of air that passes through the cartridge 210.

Figure 1:
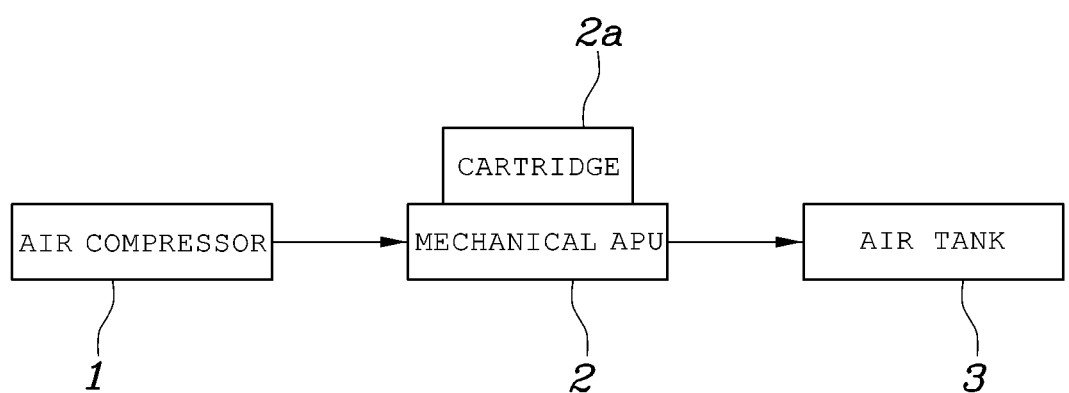
FIG. 1 is a block diagram showing the configuration of a pneumatic system equipped with a mechanical APU.
Figure 2:
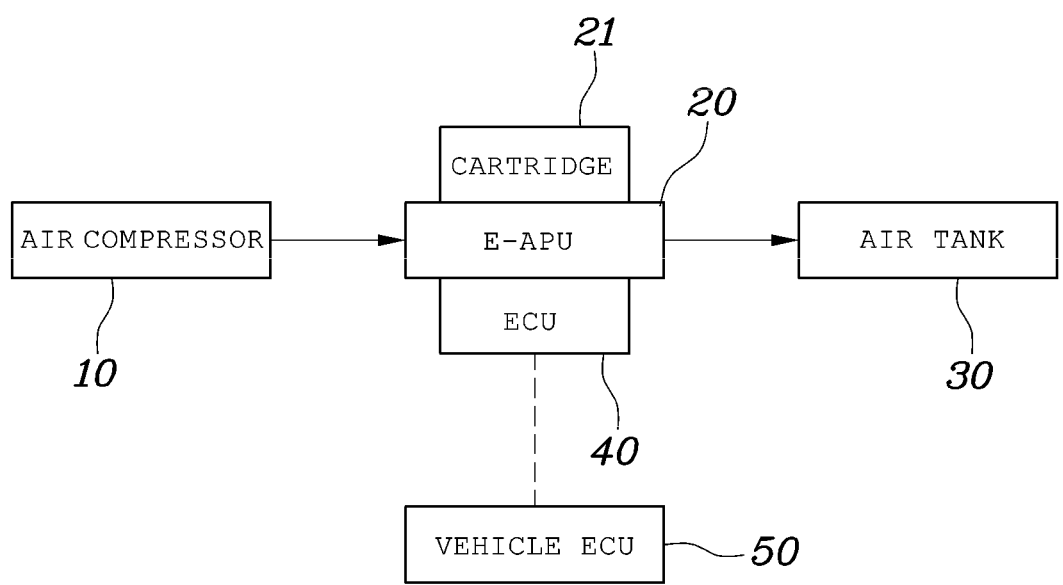
FIG. 2 is a block diagram showing the configuration of a pneumatic system equipped with an E-APU.
Figure 3:
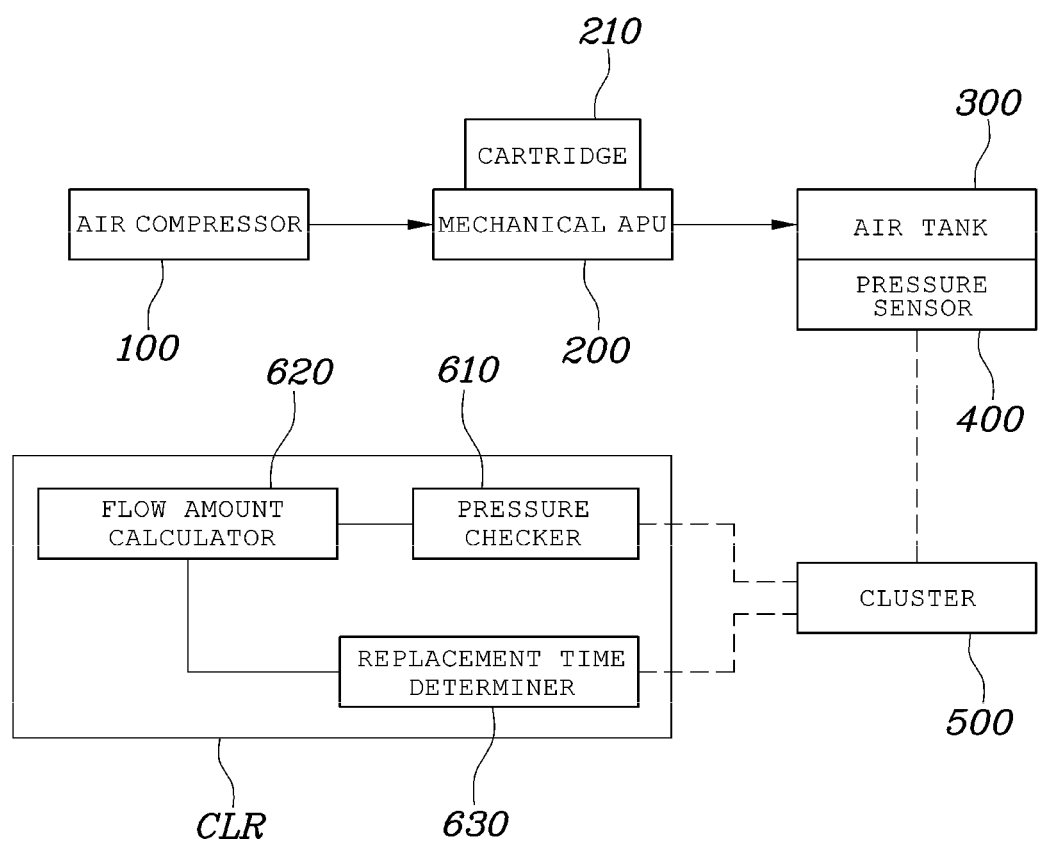
FIG. 3 is a block diagram showing the configuration when a system for predicting a replacement time of a cartridge is applied to a pneumatic system equipped with a mechanical APU in accordance with the present disclosure.

The configuration of a system for predicting replacement time that can be applied to the present disclosure is described with reference to FIG. 3. Air is compressed through an air compressor 100 and the compressed air is transmitted to the APU 200, whereby wet air is discharged and dry air is supplied to an air tank 300.

A pressure sensor 400 is disposed at the air tank 300 and measures the internal pressure of the air tank. The internal pressure of the air tank 300 is transmitted to a cluster 500, and the cluster 500 can convert an input value into CAN data and transmit the CAN data to a controller CLR.

When determining that a replacement time of the cartridge 210 has been reached, as described below, the controller CLR can transmit a signal communicating that the replacement time has been reached to the cluster 500, so the cluster 500 can turn on a cartridge replacement warning light to a driver.

The controller according to exemplary embodiments of the present disclosure can be implemented through a non-volatile memory (not shown) configured to store algorithms for controlling operation of various components of a vehicle or data about software commands for executing the algorithms, and a processor (not shown) configured to perform an operation to be described below using the data stored in the memory. The memory and the processor may be individual chips. Alternatively, the memory and the processor may be integrated in a signal chip. The processor may be implemented as one or more processors.

The controller CLR is configured to be able to calculate the passing flow amount of air through the cartridge 210 based on a pressure change of the air tank 300. Accordingly, the controller CLR may include a pressure checker 610, a passing flow amount calculator 620, and a replacement time determiner 630.

The pressure checker 610 checks the pressure of the air tank 300 detected through the pressure sensor 400.

The passing flow amount calculator 620 calculates a passing flow amount through the cartridge 210 of the APU 200 using a pressure change due to filling the air tank 300 with air, and accumulates and stores the flow amounts.

The replacement time determiner 630 determines that the replacement time of the cartridge 210 has been reached, when the total passing flow amount $Q_t$ accumulated by the passing flow amount calculator 620 exceeds a predetermined value.

That is, it is possible to calculate the replacement time of a cartridge using a pressure change of the air tank 300 even in a vehicle using the mechanical APU 200, so it is possible to replace the cartridge 210 at an appropriate time, whereby it is possible to prevent breakage of parts of the pneumatic system and increase the lifespan of the parts.

Figure 4:
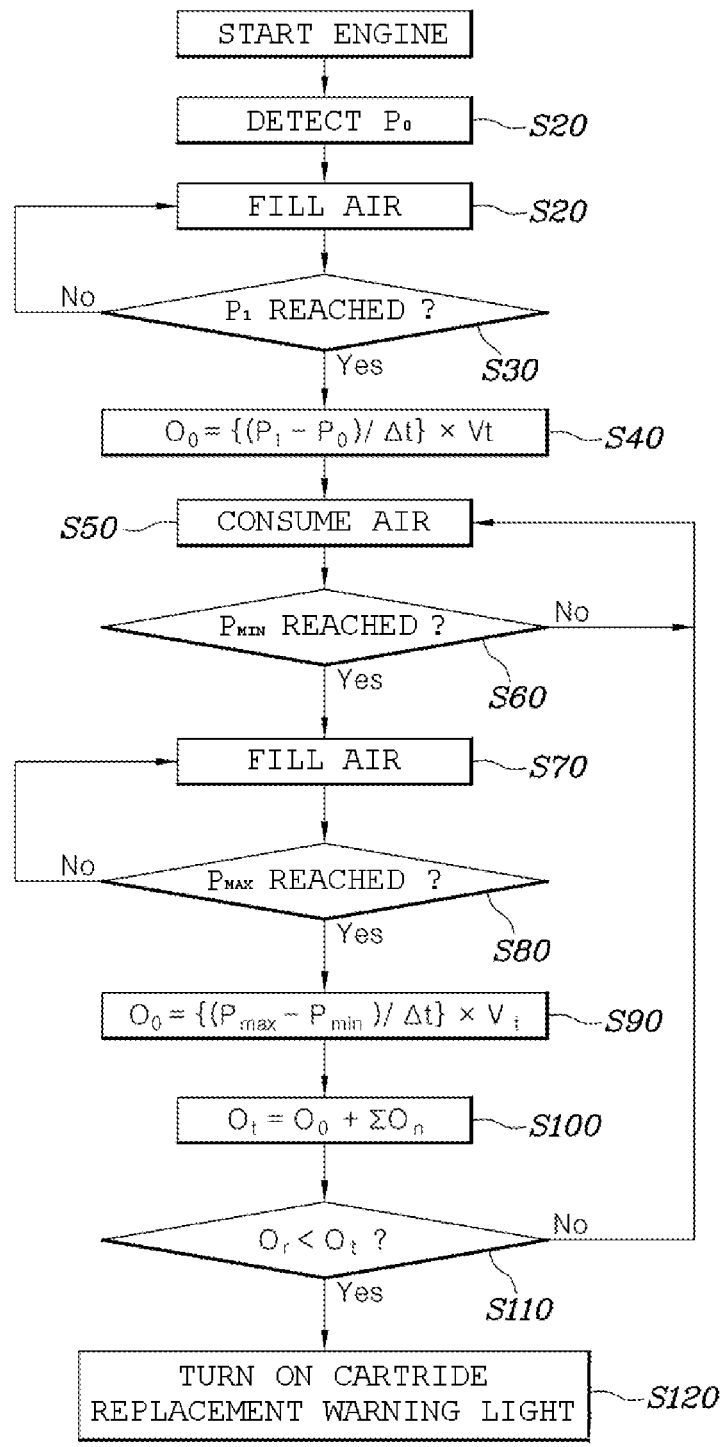
FIG. 4 is a flow chart showing control flow of a logic that predicts a replacement time of a cartridge in accordance with the present disclosure.

A method of predicting a replacement time of the cartridge 210 by use of the controller CLR according to the present disclosure is described with reference to FIGS. 3 and 4. The method includes: checking the internal pressure of the air tank 300 by the controller CLR when the engine of a vehicle is started; calculating and accumulating a passing flow amount through the cartridge 210 of the APU 200 using a pressure change due to filling the air tank 300 with air by the controller CLR; and determining that the replacement time of the cartridge 210 has been reached when the accumulated total passing flow amount $Q_t$ exceeds a predetermined value.

In particular, the passing flow amount is calculated by multiplying a pressure change value to a time variation $\Delta t$ during filling the air tank 300 with air by the total volume $V_t$ of the air tank 300. The total passing flow amount $Q_t$ is calculated by accumulating the passing flow amount that is calculated every time the air tank is filled with air.

The process of calculating the passing flow amount is described in more detail with reference to FIG. 5. The air tank 300 is filled with air if the pressure when an engine is started is less than cut-out pressure $P_{max}$.

When the internal pressure of the air tank 300 that is being filled with air reaches the cut-out pressure $P_{max}$, a first passing flow amount $Q_0$ is calculated from the following Formula 1.

$$Q_0 = \{(P_1 - P_0)/\Delta t\} \times V_t \ldots \text{(Formula 1)},$$

with the following variables:

$Q_0$: first passing flow amount (first passing flow amount after engine is started);

$P_0$: air tank pressure when engine is started;

$P_1$: first cut-out pressure after engine is started; and $V_t$: total volume of air tank.

Next, the air stored in the air tank 300 is used, and as the air is used, when the internal pressure of the air tank 300 reaches a cut-in pressure $P_{min}$, the air tank 300 is filled with air.

Further, when the internal pressure of the air tank 300 that is being filled with air reaches the cut-out pressure $P_{max}$, an n-th passing flow amount $Q_n$ is calculated from the following Formula 2.

$$Q_n = \{(P_{max} - P_{min})/\Delta t\} \times V_t \ldots \text{(Formula 2)},$$

with the following variables:

$Q_n$: n-th passing flow amount;

$P_{max}$: cut-out pressure;

$P_{min}$: cut-in pressure; and $V_t$: total volume of air tank.

The total passing flow amount $Q_t$ is calculated by accumulating the n-th passing flow amount $Q_n$ to the first passing flow amount $Q_0$.

Figure 5:
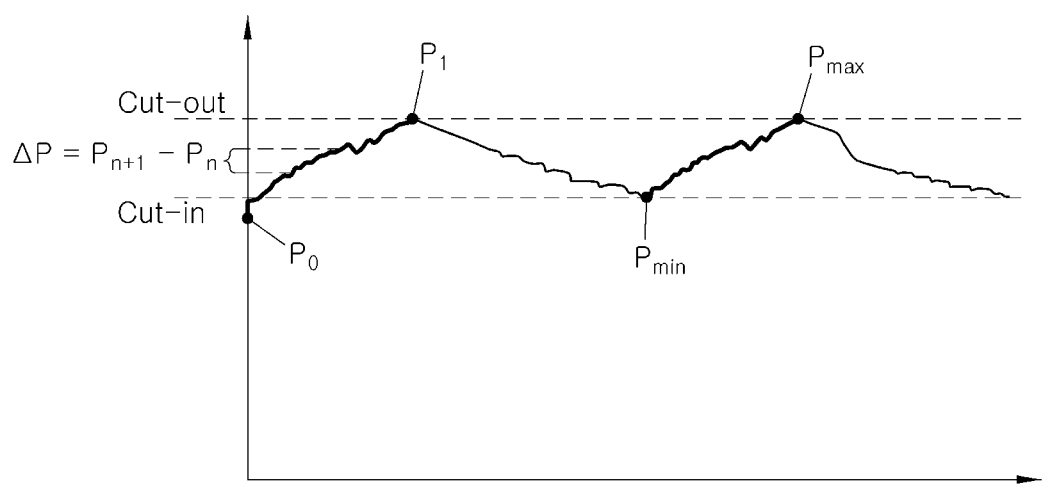
FIG. 5 is a graph showing a pressure change in an air tank according to the present disclosure.

That is, in FIG. 5, the air tank 300 is filled with air at a pressure set in the APU 200 and the air pressure while the air in the air tank is used and consumed is shown. Referring to FIG. 5, when the air tank 300 is filled with air, wet air compressed by the air compressor is discharged and passes through the cartridge 210 of the APU 200, and then the air tank 300 is filled with only dry air.

The cut-out pressure is the maximum pressure set in the air tank 300. When the air pressure in the air tank 300 reaches the cut-out pressure $P_{max}$, the air tank 300 is no longer filled with air, and in this state, a brake and various systems (an air suspension, a door, a transmission, etc.) use and consume the compressed air stored in the air tank 300.

When the air pressure in the air tank 300 drops to the cut-in pressure that is the minimum pressure set in the air tank 300 due to consumption of the compressed air in the air tank 300, the air tank 300 starts to be filled again, and this process of filling and consuming air is repeated.

That is, the process of filling the air tank 300 with air and consuming the air is repeated and the air compressed through the compressor passes through the cartridge 210 in the process of filling the air tank with air. Accordingly, it is possible to calculate the total passing flow amount $Q_t$ that has passed through the cartridge 210 by calculating the flow amount of wet air passing through the cartridge 210 based on a pressure variation $\Delta P$ during filling air, so it is possible to predict the replacement cycle of the cartridge 210.

As described above, when the controller CLR determines that the cartridge replacement time has been reached, it can display the cartridge replacement time, and may turn on a cartridge replacement warning light to the cluster 500.

Meanwhile, the control flow of a logic that predicts the replacement time of the cartridge 210 is sequentially described with reference to FIG. 4. When the engine of a vehicle is started, the pressure in the air tank 300 is detected (S10).

Further, when the internal pressure of the air tank 300 is less than the cut-out pressure $P_{max}$, air is compressed through the air compressor and the compressed air passes through the cartridge 210 and fills the air tank 300 (S20).

It is determined whether the internal pressure of the air tank 300 reaches $P_1$ corresponding to the first cut-out pressure $P_{max}$ after the engine is started while the air tank 300 is filled with air.

As the result of determination, when the pressure of the air tank 300 reaches $P_1$, a first passing flow amount $Q_0$ that is the first passing flow amount through the cartridge 210 after the engine is started is calculated through the following Formula 1.

$$Q_0 = \{(P_1 - P_0)/\Delta t\} \times V_t \ldots \quad \text{(Formula 1)}$$

That is, the first passing flow amount $Q_0$ is calculated by multiplying a pressure change ($\Delta P$: $P_1 - P_0$) between engine-start early pressure $P_0$ to a time variation $\Delta t$ when the compressed air is accumulated and the first cut-out pressure $P_1$ after the engine is started by the total volume $V_t$ of the air tank 300.

$P_1$ is a point in time when the pressure change $P_{n+1} - P_n$ between the pressure $P_{n+1}$ measured in the next cycle and the current pressure $P_n$ becomes 0 or becomes smaller than 0, which is a point in time when the slope of the pressure change changes from a positive value (+) to a negative value (−).

As described above, when the first cut-out pressure $P_1$ is reached after the engine is started, the air tank 300 is no longer filled with air and the air in the air tank 300 is used and consumed (S50). Further, whether the internal pressure of the air tank 300 reaches the cut-in pressure $P_{min}$ is determined in the process of consuming the air (S60).

As the result of this determination, when the pressure of the air tank 300 reaches $P_{min}$, air is compressed through the air compressor 100 and the compressed air passes through the cartridge 210, whereby the air tank 300 is filled again with the compressed air (S70).

$P_{min}$ is a point in time when the pressure change $P_{n+1} - P_n$ between the pressure $P_{n+1}$ measured in the next cycle and the current pressure $P_n$ becomes 0 or becomes larger than 0, which is a point in time when the slope of the pressure change changes from a negative value (−) to a positive value (+).

Next, it is determined whether the internal pressure of the air tank 300 reaches the cut-out pressure $P_{max}$ while the air tank 300 is filled with air (S80).

As the result of this determination, when the pressure of the air tank 300 reaches $P_{max}$, the n-th passing flow amount $Q_n$ corresponding to the difference $P_{max} - P_{min}$ between the cut-out pressure $P_{max}$ and the cut-in pressure $P_{min}$ is calculated using the following Formula 2.

$$Q_n = \{(P_{max} - P_{min})/\Delta t\} \times V_t \ldots \quad \text{(Formula 2)}$$

That is, while the air tank is filled with the compressed air, the n-th passing flow amount $Q_n$ is calculated by multiplying the pressure variation ($\Delta P$: $P_{max} - P_{min}$) between the cut-in pressure $P_{min}$ and the cut-out pressure $P_{max}$ to the time variation $\Delta t$ by the total volume $V_t$ of the air tank 300.

$P_{max}$ is a point in time when the pressure change $P_{n+1} - P_n$ between the pressure $P_{n+1}$ measured in the next cycle and the current pressure $P_n$ becomes 0 or becomes smaller than 0, which is a point in time when the slope of the pressure change changes from a positive value (+) to a negative value (−).

Next, the total passing flow amount $Q_t$ through the cartridge 210 is calculated by repeatedly calculating and accumulatively storing the n-th passing flow amount $Q_n$ while the vehicle is driven (S100).

Whether the calculated total passing flow amount $Q_t$ exceeds a cartridge replacement time flow amount $Q_r$ is determined (S110), and if so, the cartridge replacement time warning light is turned on (S120).

As described above, according to the present disclosure, it is possible to predict a cartridge replacement time of the APU 200 even in a vehicle equipped with the mechanical APU 200 and warn a driver of the replacement time, so it is possible to replace the cartridge 210 at an accurate time. Accordingly, it is possible to prevent breakage of the parts of a compressed air system and increase the lifespan of the parts.

That is, the phenomenon that oil and foreign substances reach a compressed air system (a compressed air storage, a valve, and an actuator) due to delay of the replacement time of a cartridge in a vehicle that consumes a large amount of compressed air is prevented. Accordingly, it is possible to prevent breakage or reduction of lifespan of the system. Therefore, it is possible to reduce unnecessary repair costs and the possibility of an accident that may occur due to reduction of braking force.

Further, it is possible to extend the replacement time of a cartridge more than the recommended replacement time in a vehicle that consumes a small amount of compressed air, so the maintenance cost of the vehicle can be reduced.

Further, there is no need for using an expensive E-APU that informs a driver of a cartridge replacement time by automatically calculating the passing flow amount through the cartridge, so the cost of a vehicle can be decreased.

On the other hand, although the present disclosure was described with reference to the detailed embodiments, it is apparent to those skilled in the art that the present disclosure may be changed and modified in various ways without the scope of the present disclosure and it should be noted that the changes and modifications are included in claims.

What is claimed is:

1. A method of predicting a replacement time of a cartridge for an air processing unit (APU) of a vehicle, the method comprising:
   checking, by a controller, an internal pressure of an air tank when an engine of the vehicle is started;
   calculating and accumulating, by the controller, a passing flow amount through the cartridge of the APU using a pressure change due to filling the air tank with air; and
   determining, by the controller, that the replacement time of the cartridge has been reached when an accumulated total passing flow amount exceeds a predetermined value.

2. The method of claim 1, wherein he passing flow amount is calculated by multiplying a pressure change value to a time variation during filling the air tank with air by a total volume of the air tank, and the total passing flow amount is calculated by accumulating the passing flow amount that is calculated every time the air tank is filled with air.

3. The method of claim 1, wherein calculating the passing flow amount includes:
   filling the air tank with air if pressure when an engine is started is less than a cut-out pressure;
   calculating a first passing flow amount from a following Formula 1 when an internal pressure of the air tank that is being filled with air reaches the cut-out pressure;
   using and consuming the air stored in the air tank;
   filling the air tank with air when the internal pressure of the air tank reaches cut-in pressure due to consumption of the air;
   calculating an n-th passing flow amount from a following Formula 2 when the internal pressure of the air tank that is being filled with air reaches the cut-out pressure; and
   calculating a total passing flow amount by accumulating the n-th passing flow amount to the first passing flow amount, $$Q_0 = \{(P_1 - P_0)/\Delta t\} \times V_t \ldots \text{(Formula 1), and}$$

$$Q_n = \{(P_{max} - P_{min})/\Delta t\} \times V_t \ldots \text{(Formula 2),}$$

wherein $Q_0$ is the first passing flow amount,
$P_0$ is the air tank pressure when the engine is started,
$P_1$ is the first cut-out pressure after the engine is started,
$Q_n$ is the n-th passing flow amount,
$P_{max}$ is the cut-out pressure,
$P_{min}$ is the cut-in pressure, and
$V_t$ is the total volume of the air tank.

4. The method of claim 1, further comprising showing a cartridge replacement time when determining that the replacement time of the cartridge has been reached.

5. A system for predicting a replacement time of a cartridge for an air processing unit (APU) of a vehicle, the system comprising:
 a pressure checker configured to check a pressure of an air tank detected through a pressure sensor;
 a passing flow amount calculator configured to calculate a passing flow amount through the cartridge of the APU using a pressure change due to filling the air tank with air, and accumulating and storing the flow amounts; and
 a replacement time determiner configured to determine that the replacement time of the cartridge has been reached, when a total passing flow amount accumulated by the passing flow amount calculator exceeds a predetermined value.

6. A non-transitory computer readable medium containing program instructions executed by a processor, the computer readable medium comprising:
 program instructions that check an internal pressure of an air tank when an engine of a vehicle is started;
 program instructions that calculate and accumulate a passing flow amount through a cartridge of an air processing unit (APU) using a pressure change due to filling the air tank with air; and
 program instructions that determine that the replacement time of the cartridge has been reached when an accumulated total passing flow amount exceeds a predetermined value.

\* \* \* \* \*